United States Patent
Ma

(10) Patent No.: US 6,575,486 B2
(45) Date of Patent: Jun. 10, 2003

(54) FOLDING STRUCTURE OF A CHILDREN TRICYCLE

(75) Inventor: Pei-Chuan Ma, Taipei (TW)

(73) Assignee: New Art City Industrial Co., Ltd., Taipei (TW)

(*) Notice: Subject to any disclaimer, the term of this patent is extended or adjusted under 35 U.S.C. 154(b) by 0 days.

(21) Appl. No.: 09/986,518

(22) Filed: Nov. 1, 2001

(65) Prior Publication Data

US 2003/0080533 A1 May 1, 2003

(51) Int. Cl.$^7$ ................................................. B62K 5/06
(52) U.S. Cl. ........................................ 280/287; 280/282
(58) Field of Search ................................. 280/287, 282, 280/281.1, 284, 288.1, 288.3, 278, 288; D12/112

(56) References Cited

U.S. PATENT DOCUMENTS

| | | | | |
|---|---|---|---|---|
| 4,457,529 A | * | 7/1984 | Shamie et al. | 280/278 |
| 4,958,842 A | * | 9/1990 | Chang | 280/7.1 |
| 5,145,196 A | * | 9/1992 | Langkamp | 280/278 |
| 5,562,300 A | * | 10/1996 | Nelson | 280/655.1 |
| 5,924,713 A | * | 7/1999 | Li | 280/270 |
| 6,152,473 A | * | 11/2000 | Shih | 280/278 |

* cited by examiner

*Primary Examiner*—Avraham Lerner
(74) *Attorney, Agent, or Firm*—Leong C. Lei

(57) ABSTRACT

A folding structure of a children tricycle is disclosed. The folding structure has a pivotal seat connected to a front and rear wheel rod. The fixing rods of the front and rear wheel allows the pivotal seat to rotate, wherein the rear wheel fixing rod is connected to a substantially "C"-shaped fixing seat and the through hole near to the top edge of the two wheel rods is pivotally connected to the fixing seat. The top of the wheel rod is provided with a resilient fastener such that the wheel rod can make use of the through hole as fulcrum to provide extending and folding. The fastener can engage at different fastening holes so that when in use, the wheel rod can be extended and when not in use, the wheel rod can be folded. Thus, the folding structure allows the tricycle to be retracted for storage and transportation.

1 Claim, 11 Drawing Sheets

US 6,575,486 B2

FOLDING STRUCTURE OF A CHILDREN TRICYCLE

TECHNICAL FIELD OF THE INVENTION

The present invention relates to a folding structure of a children tricycle, and in particular, a folding structure facilitating combination of the children tricycle when the tricycle is in use, and is retractable or foldable when the tricycle is not in use. The rear wheels of the folding structure can be folded and is portable, and facilitates storage without occupying space.

DESCRIPTION OF THE PRIOR ART

Conventional three-wheeled tricycle has three wheels and these wheels are fixed at a specific position. When the tricycle is not in use, the rear wheels cannot be folded together to facilitate transportation or storage. Further, as the rear wheels are positioned far apart, the tricycle occupies excessive space when in storage if the tricycle is not in use. Accordingly it is an object of the present invention to provide a folding structure for a children tricycle which mitigates the above drawback.

SUMMARY OF THE INVENTION

Accordingly, it is an object of the present invention to provide a folding structure of children tricycle, wherein the tricycle can be easily folded, and the tricycle after folding is portable and facilitates storage.

An aspect of the present invention is to provide a folding structure of a children tricycle, wherein the two side boards of the pivotal seat are provided with appropriate sloping front and rear notches, and the notch is an arch-shape, and a sectional hole is provided to the rear wheel fixing rod near the top end thereof such that the bending section of the support rod passes through the sectional hole, and the bending section is engaged at the front and rear notches; the rear wheel fixing rod is connected to a fixing seat having a pair of symmetrical fixing holes, at the top of the fixing hole, fastening holes are provided at different positions such that the two bottom ends are pivotally connected to the wheel rod of the rear wheel and the through hole is connected at the fixing hole of the fixing seat, and the through hole of the wheel seat is provided with a fastener having a spring, the wheel rod makes use of the through hole as fulcrum to provide extending and folding function such that the fastener is fastened at different fastening holes for use of the tricycle, or the combination of the rear wheel rod to facilitate transportation or storage.

Yet another object of the present invention is to provide a folding structure of a children tricycle, wherein a pivotal seat is provided to the folding structure and a support rod is connected to a fixing rod at the front and rear wheel by way of a front and rear notch, such that a bending section of the support rod is positioned at the front and rear notch, thereby the tricycle can be extended or retracted, facilitating storage or using.

A further object of the present invention is to provide a folding structure of a children tricycle, wherein the two sides of the top edge of the front and rear notch of the pivotal seat are provided with symmetrical fastening holes and the bending section of the support rod mounted through the sectional hole of the rear wheel fixing rod is provided with a fastener having protrusion and a spring such that when the bending section of the support rod is engaged with the rear and front notch the protrusion is engaged with the fastening hole for fixing.

Still a further object of the present invention is to provide a folding structure of a children tricycle, wherein the fastener is provided with a pulling cable for pulling so as to dislocate the protrusion from the fastening hole of the pivotal seat.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
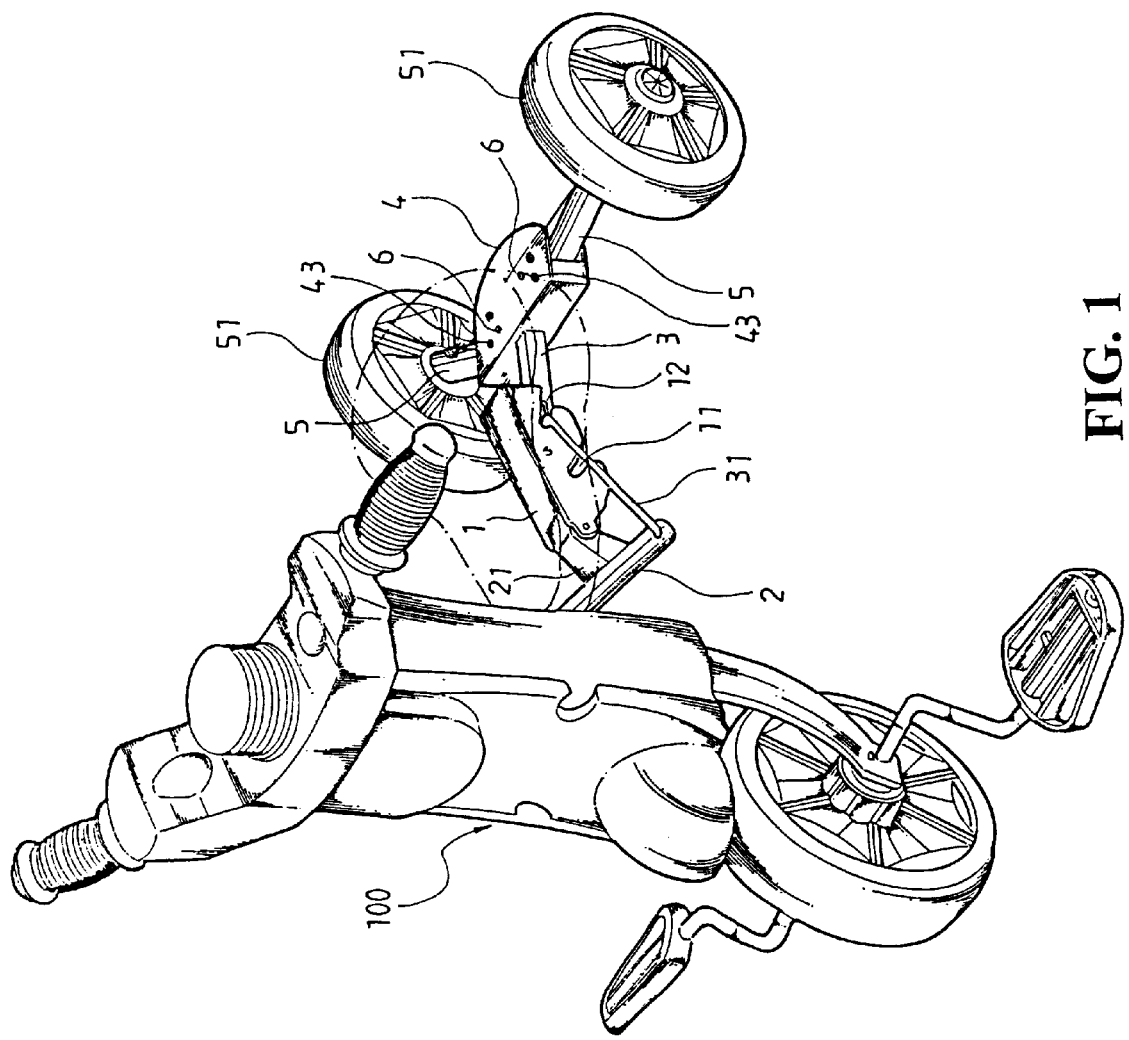
FIG. 1 is a perspective view of the present invention.
Figure 2:
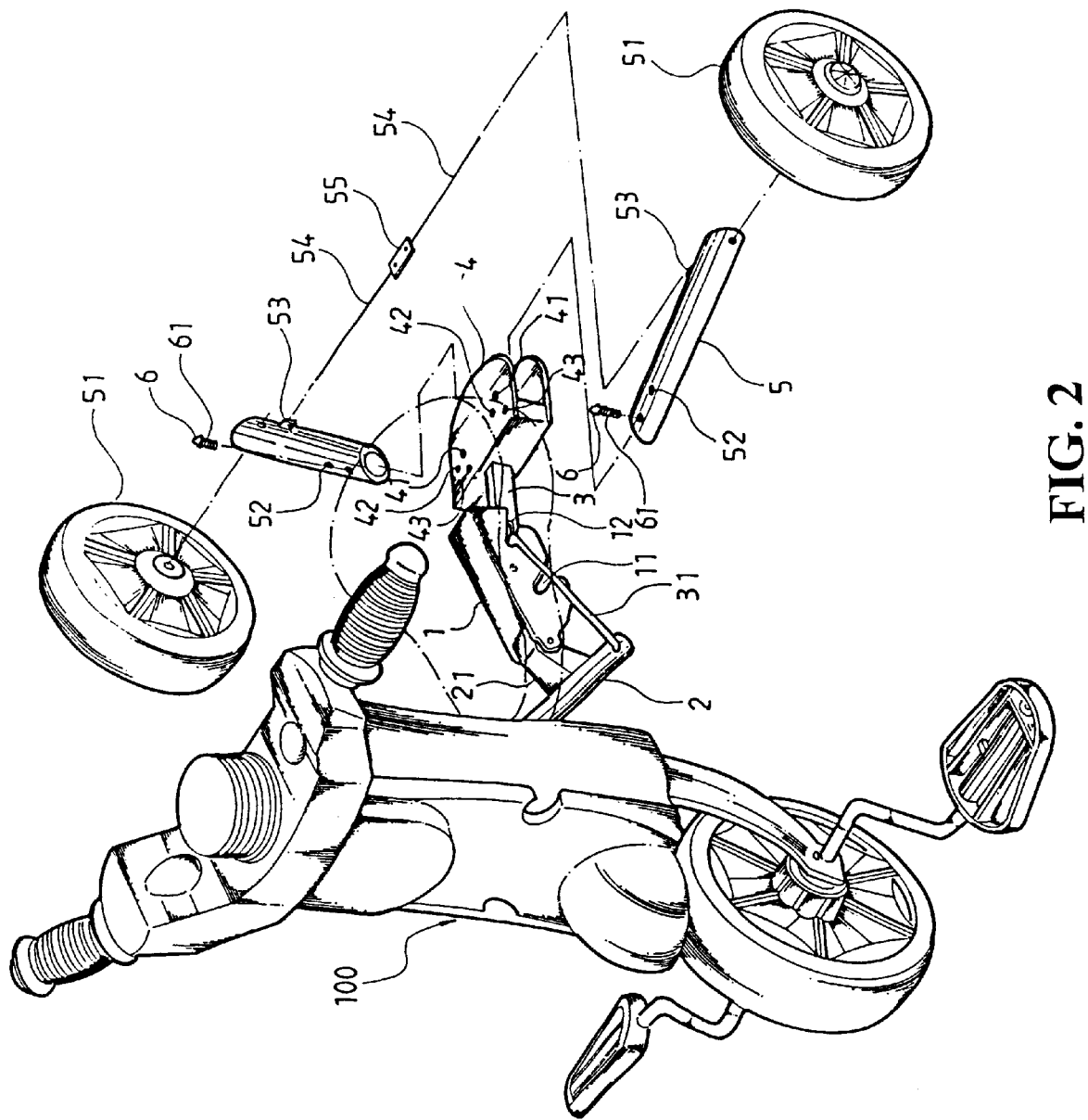
FIGS. 2 and 3 show perspective exploded view of the present invention.
Figure 3:
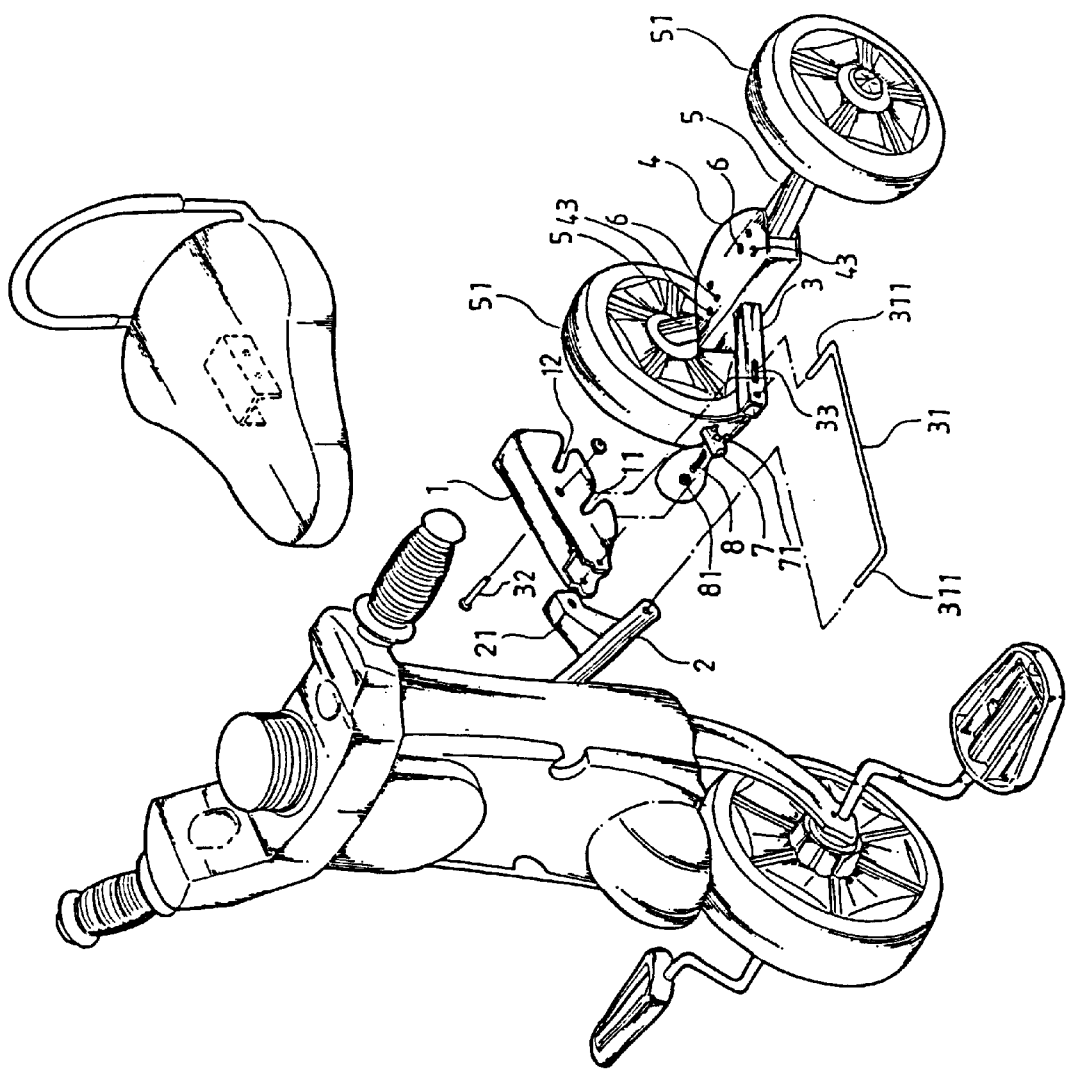
Figure 4:
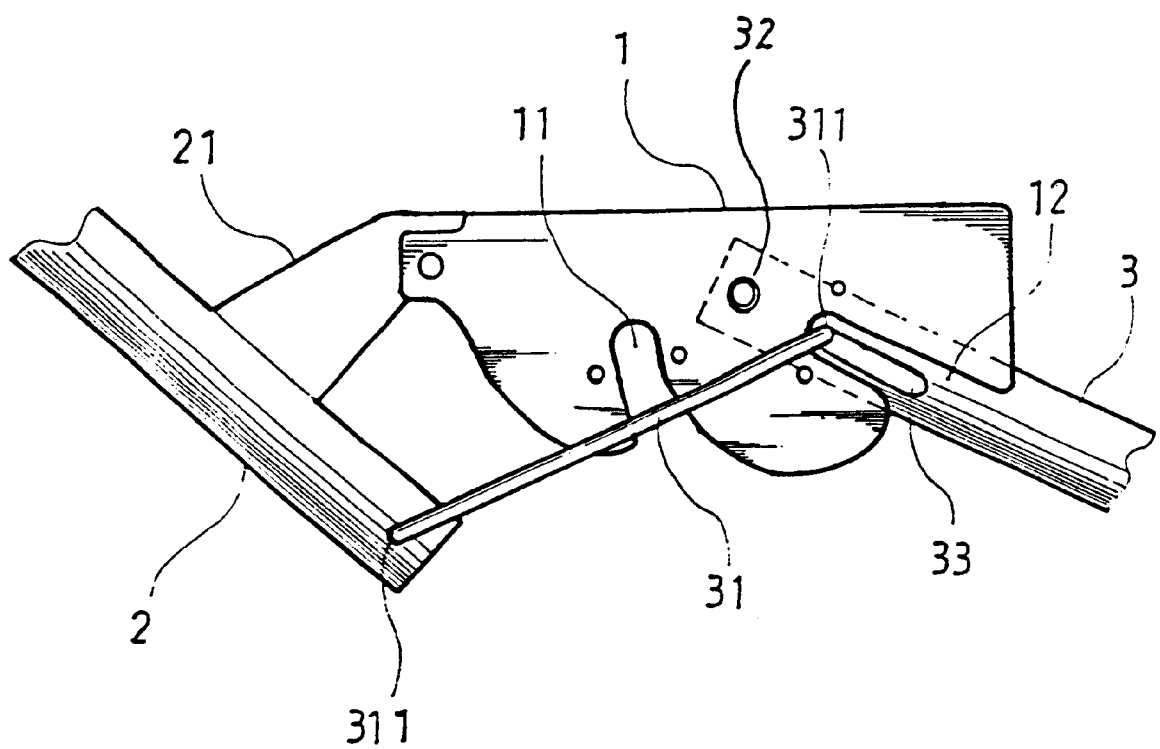
FIG. 4 is a schematic view of the pivotal seat structure of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Referring to FIGS. 1, 2, 3 and 4, the folding structure of the present invention has an arch-shaped pivotal seat 1, and the front end of the pivotal seat 1 is connected to a bending connecting section 21 of a front wheel fixing rod 2. The rear end of the pivotal seat 1 is connected to a square shaped fixing rod 3, and the sideboard of the pivotal seat is provided with a front and a rear notch 11, 12. Between the front and rear wheel-fixing rod 2, 3, a support rod 31 having two ends being vertically bent is provided. The rear wheel fixing rod 3 has one end being fastened with a bolt 32 onto the side board of the pivot seat 1, and at the proximity of the connection end, a sectional hole 33 is provided, and the two ends of the support rod 31 are provided with two bending section 311 such that one section passes through the sectional hole 33 and is fastened to a fastener 7 having a protrusion 71 and a spring 8, and a nut 81 is used for fastening thereto. A pulling cable 72 is provided to the fastener 7 such that after the support rod 31 has been engaged at the front and rear notch 11, 12, the tricycle 100 can be folded or extended for normal use.

The rear wheel-fixing rod 3 is connected to a substantial "C"-shaped fixing seat 4, and there are two symmetrical fixing holes 41 on the fixing seat 4. On the top of the fixing hole 41, there are fastening holes 42, 43 located at different positions.

The two wheel rods 5 having a bottom end are pivotally mounted to the fixing hole 41 of the fixing seat 41, and the top of the fixing hole 41 of the wheel rod 5 is a fastener 6 mounted onto a spring 61 such that the two wheel rods 5 make use of the through hole 52 as a fulcrum for folding or extending. In the course of folding and extending, the fastener 6 can engage at the various fastening holes 42, 43. Therefore, this provides a positioning of the wheel rod 5 and the wheel rod 5 is extended when the tricycle is in use, or is folded toward the center when the tricycle is not in use. This will facilitate transportation or storage of the tricycle.

At a position where the bottom edge of the two wheel rods 5 is near to the rear wheel 51, a pair of symmetrical lugs 53 are provided for the connection with the two connection rod 54 and one end of the connection rod 54 is connected to a connection disc 55 such that when the two wheel rods 5 are extended, the pulling force of the connection rod 54 provides a more stable fixing.

Figure 6:
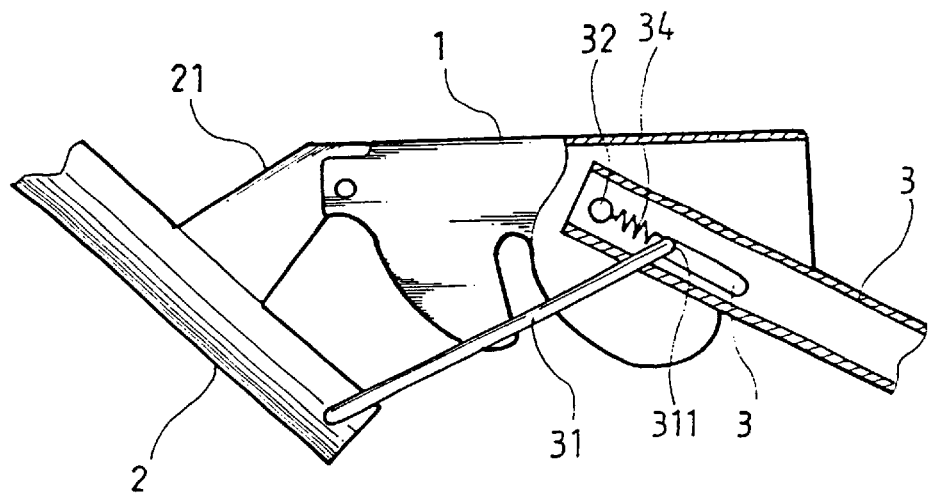
FIGS. 6 and 7 show the action of the pivotal seat of the present invention.
Figure 8:
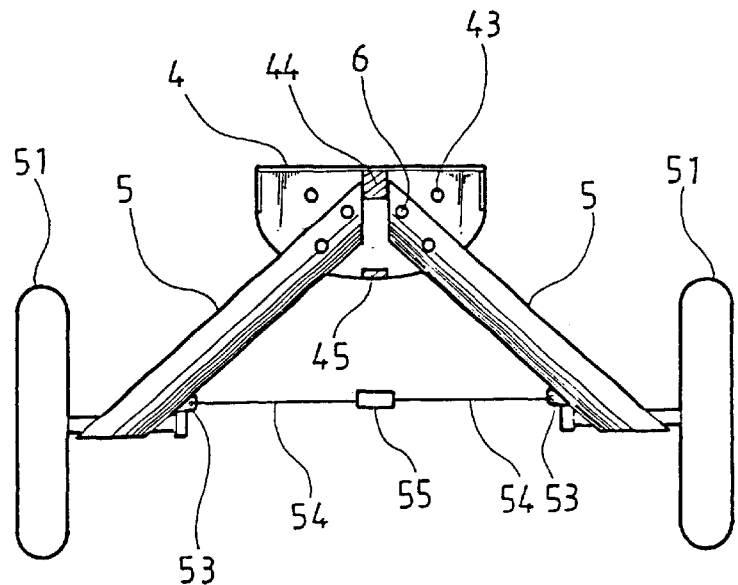
FIG. 8 shows the folding structure in application in accordance with the present invention.

Referring to FIGS. 1, 6, and 8 when in use the rear bending section 311 of the support rod 31 is mounted onto the notch 12 of the pivotal seat 1, and a spring 34 is connected between the bending section 311 and the bolt 32 so as to provide appropriate pulling force. The top and bottom of the inner edge of the fixing seat 4 are provided with reinforcing ribs 44, 45 of appropriate width such that when the wheel rod 5 is extended, the fastener 6 is fastened onto the fastening hole 42 and the top edge therefore urges at the top reinforcing rib 44 so as to avoid excessive extension, and the lower reinforcing rib 45 is used to prevent the opening of the fixing seat 4 from deformation.

Figure 5:
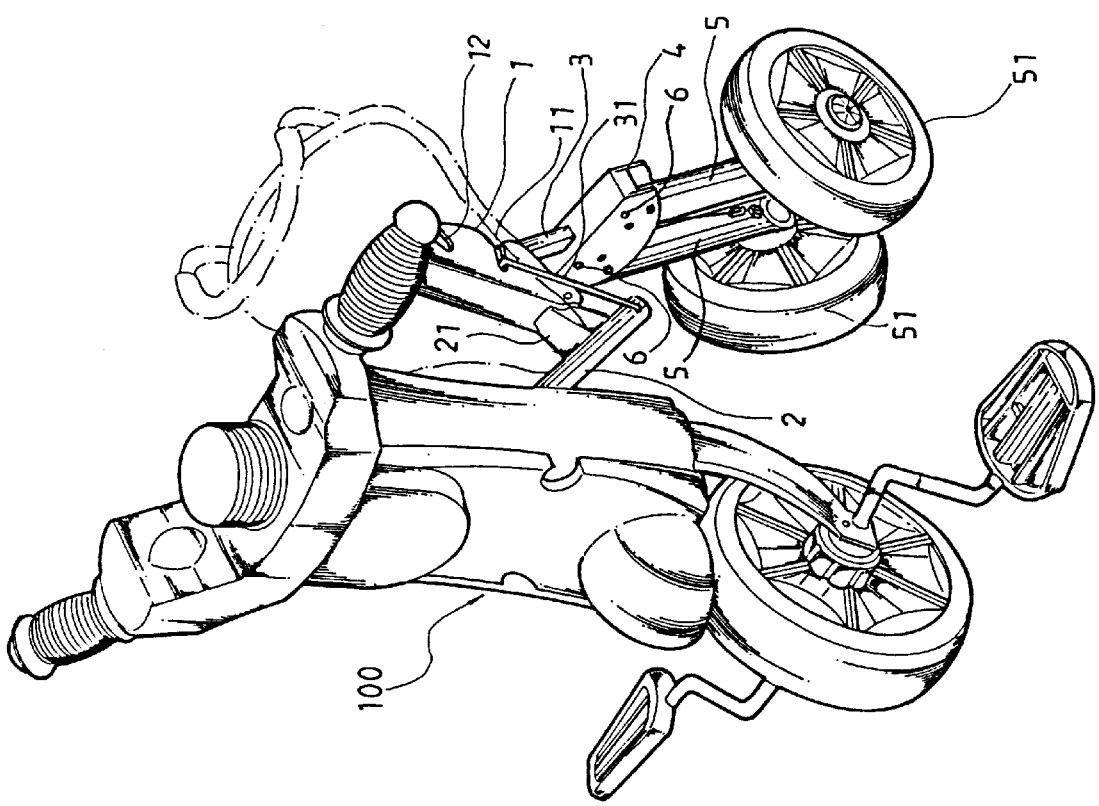
FIG. 5 is a perspective view showing the folding of the present invention.
Figure 7:
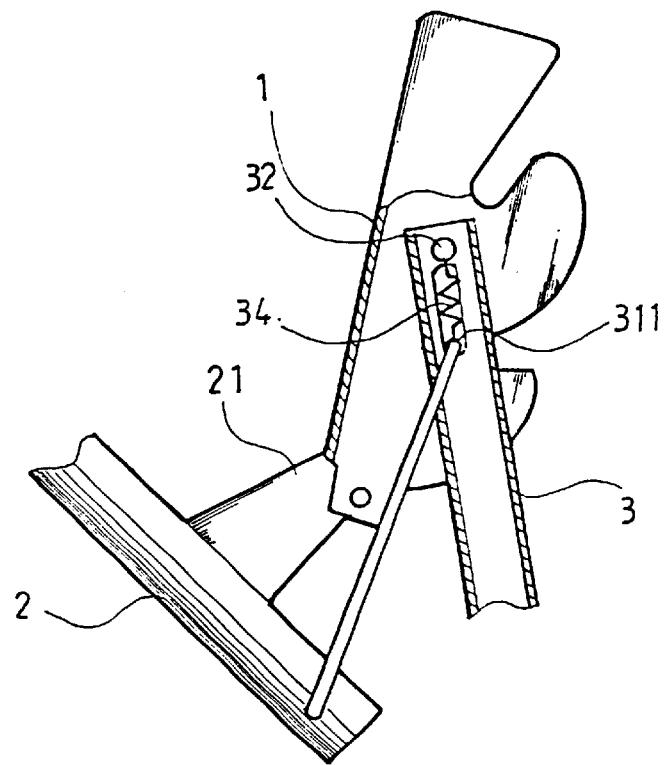
Figure 9:
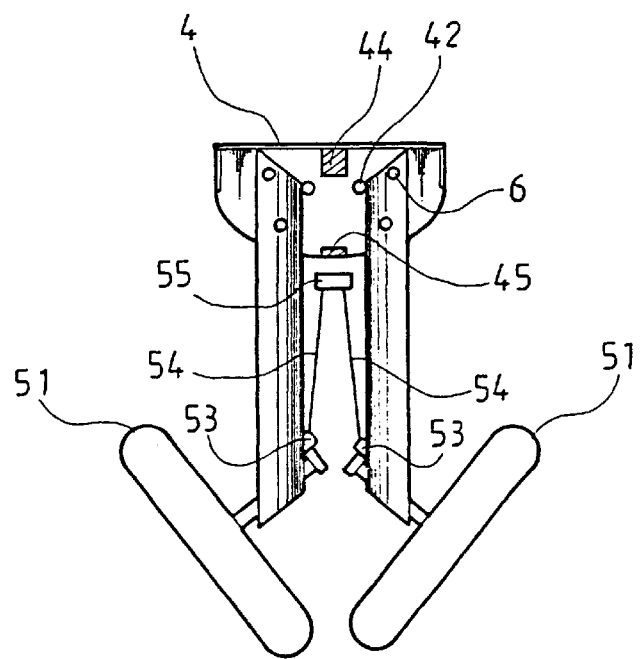
FIG. 9 shows the folding structure in folding situation in accordance with the present invention.

Referring to FIGS. 5, 7 and 9, when the folding structure is retracted, the rear bending section 311 of the support rod 31 on the pivotal seat 1 is engaged with the notch 11, and at the same time, the fastener 6 of the wheel rod 5 is dislocated from the fastening hole 42, and the rod 5 is folded inward such that the fastener 6 is fastened at another fastening hole 43, and the two wheel rods 5 are vertically arranged, which facilitates transportation and storage of the tricycle.

Figure 10:
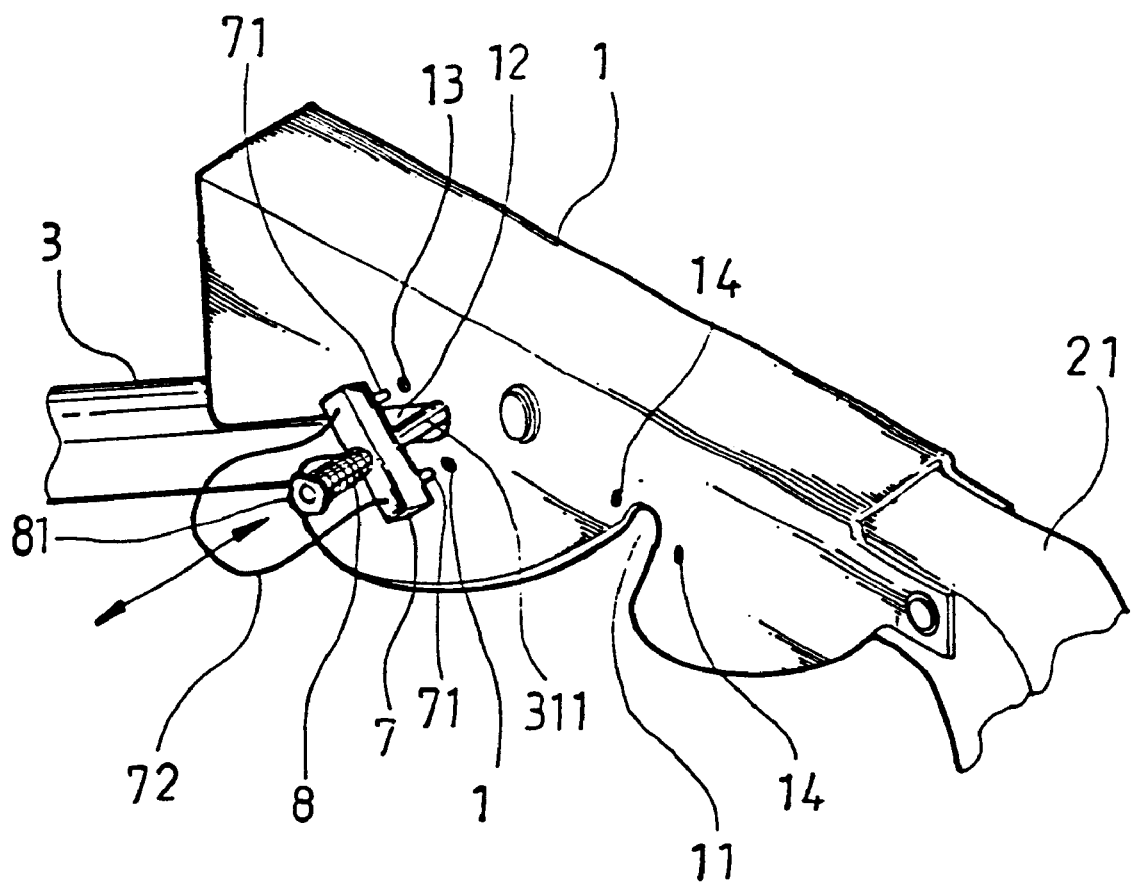
FIG. 10 is a schematic view showing the pivotal seat mounting structure of the present invention.
Figure 11:
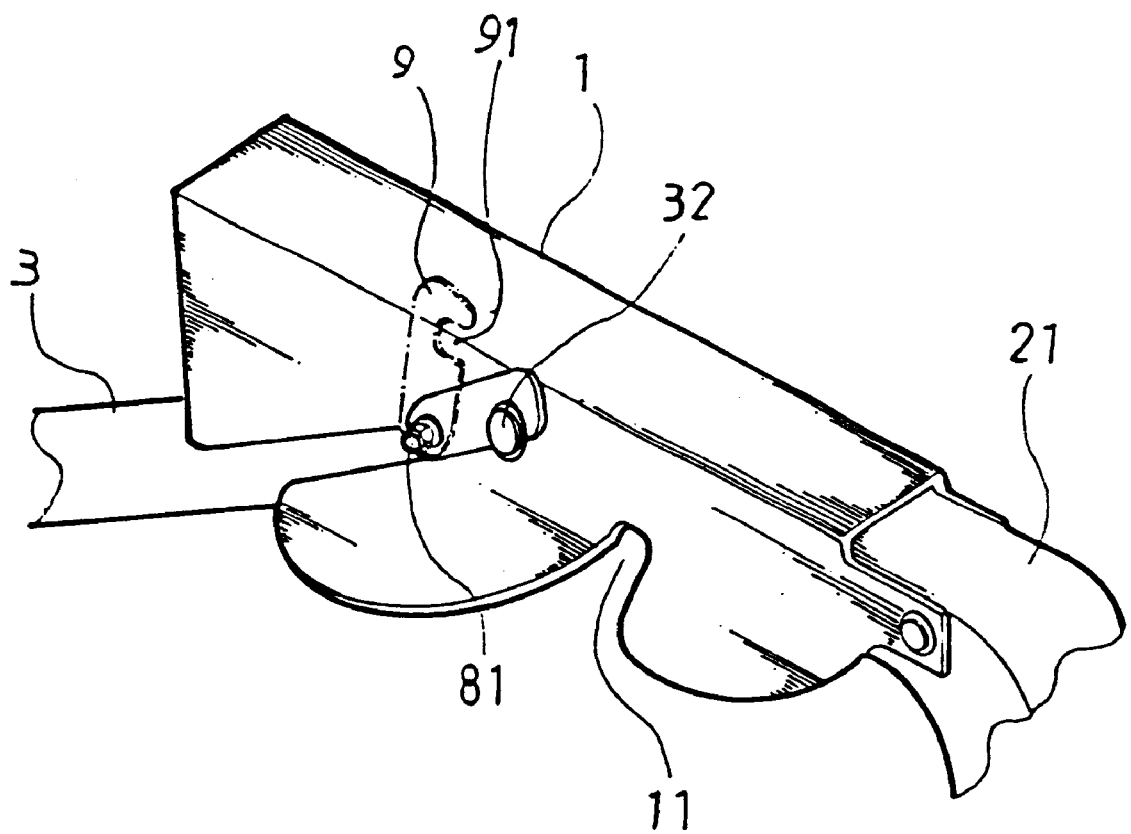
FIG. 11 is another preferred embodiment showing the pivotal seat mounting structure of the present invention.
Figure 12:
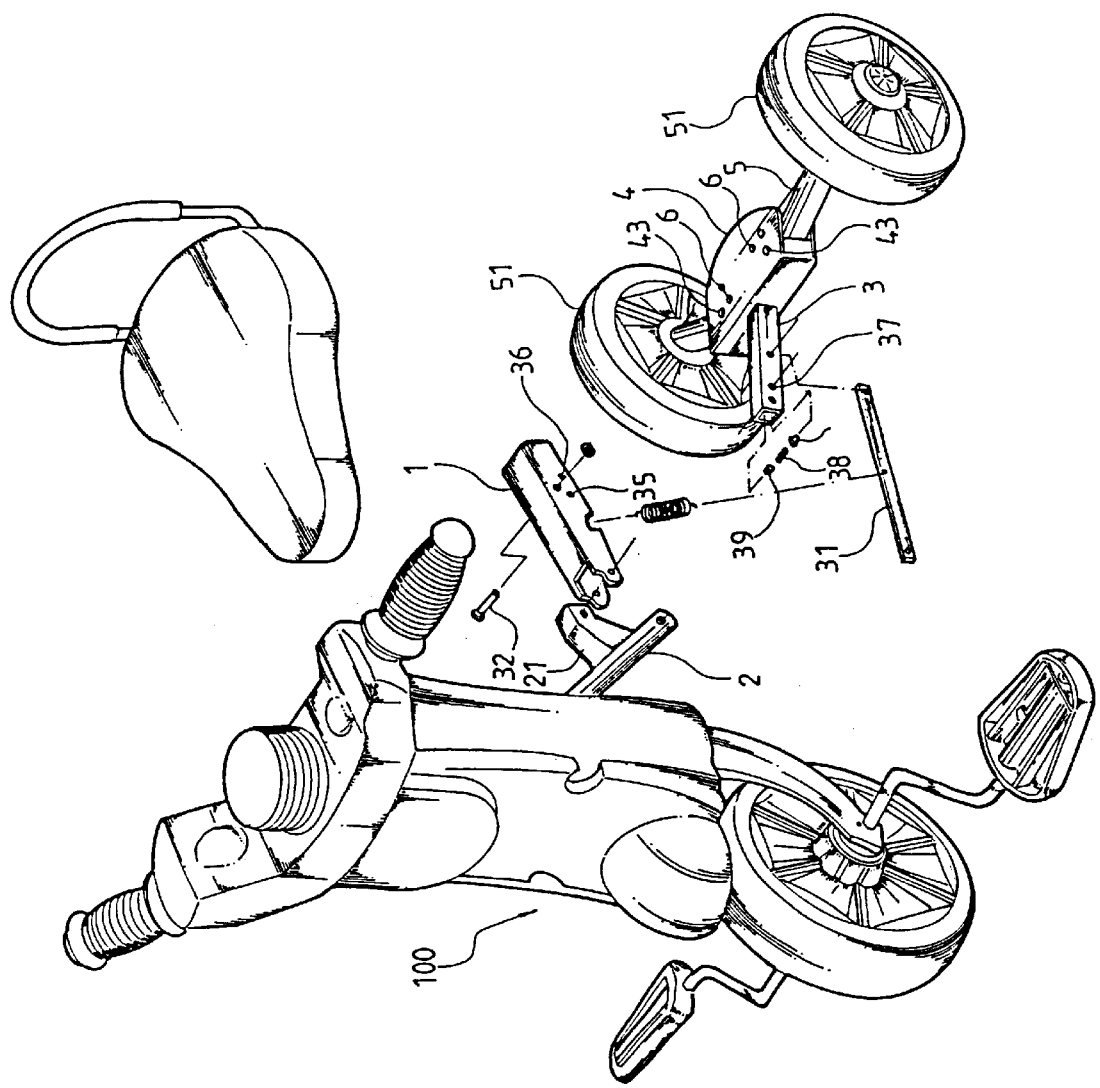
FIG. 12 is another preferred embodiment of the pivotal seat in accordance with the present invention.
Figure 13:
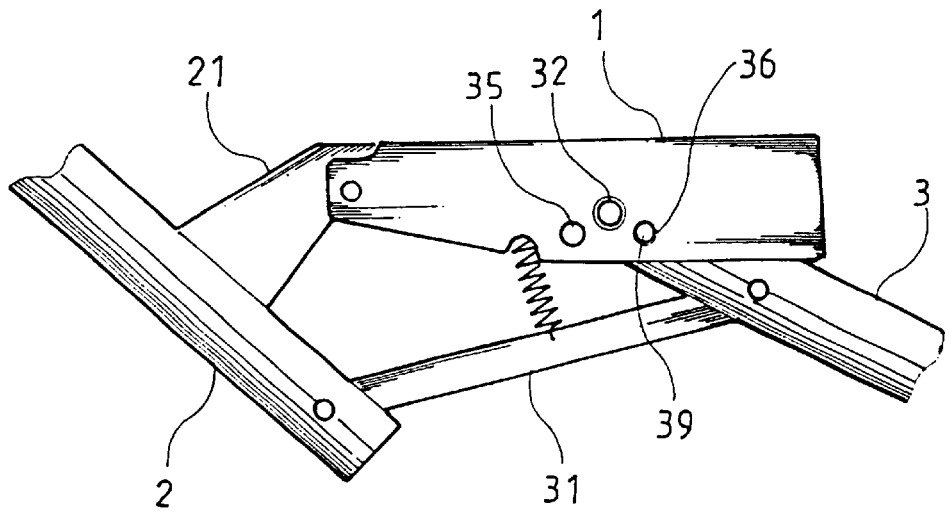
FIGS. 13 and 14 show action of the preferred embodiment shown in FIG. 12.
Figure 14:
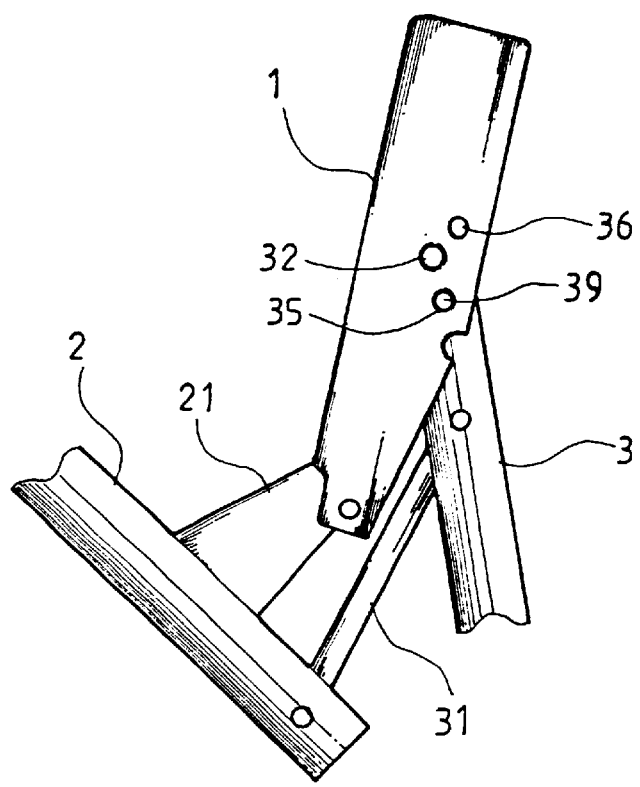

Referring to FIG. 10, there is shown a folding or an extension function being performed. The protrusion 71 is engaged at the fastening holes 13, 14 of the notches 11, 12 so that the fastener 7 is engaged and will not be dislocated. As shown in FIG. 11, the bending section 311 of the support rod 31 is provided with a fastening disc 9 and is fastened to the bolt 32 by means of the fastening hole 91. Similarly, a fixing effect is obtained. Referring to FIG. 12, the two sides at the bottom of the bolt 32 are provided with a fastening holes 35, 36 and a fixing hole 37 is provided to the fixing rod 3 so as to mount with a spring 38 and a fastener 39. As shown in FIGS. 13 and 14, the fastener 39 is fastened onto the fastening holes 35, 36 so that the tricycle is extended for use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A folding structure for a tricycle, the structure comprising a pivotal seat connected to a bending connection section of a front wheel fixing rod, the center of two lateral sides of the pivotal seat being connected to a rear wheel fixing rod and the top of the pivotal seat being connected to a seat such that the front and rear wheel fixing rods provide rotation, and a support rod having top and bottom ends which are bent, the ends being mounted to the front and rear wheel fixing rods, wherein two side boards of the pivotal seat are provided with sloping front and rear arched notches, and a sectional hole is provided to the rear wheel fixing rod near the top end of the pivotal seat, such that the top end of the support rod passes through the sectional hole, and engages the front and rear notches; the rear wheel fixing rod further being connected to a fixing seat having a pair of symmetrical fixing holes at the top of the fixing seat, fastening holes provided at different positions such that the two bottom ends of the support rod are pivotally connected to wheel rods of a pair of rear wheels; a through hole on each wheel rod provided with a fastener having a spring, the wheel rods using the through hole as a fulcrum to provide extending and folding function such that the fastener is fastened at one fastening hole for use of the tricycle, and another fastening hole for storage in a folded position.

* * * * *